(12) United States Patent
Scialli et al.

(10) Patent No.: US 11,446,567 B2
(45) Date of Patent: Sep. 20, 2022

(54) DIGITAL CHARACTER INTERACTING WITH CUSTOMER IN PHYSICAL REALM

(71) Applicant: UNIVERSAL CITY STUDIOS LLC, Universal City, CA (US)

(72) Inventors: Sarah Scialli, Los Angeles, CA (US); Demian Gordon, Culver City, CA (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 4 days.

(21) Appl. No.: 15/931,377

(22) Filed: May 13, 2020

(65) Prior Publication Data
US 2020/0391105 A1 Dec. 17, 2020

Related U.S. Application Data

(60) Provisional application No. 62/860,188, filed on Jun. 11, 2019.

(51) Int. Cl.
*A63F 13/23* (2014.01)
*G10L 25/51* (2013.01)
(Continued)

(52) U.S. Cl.
CPC ............ *A63F 13/23* (2014.09); *A63F 13/211* (2014.09); *A63F 13/213* (2014.09);
(Continued)

(58) Field of Classification Search
CPC ...... A63F 13/23; A63F 13/211; A63F 13/213; A63F 13/215; A63F 2300/1025;
(Continued)

(56) References Cited

U.S. PATENT DOCUMENTS 5,884,029 A * 3/1999 Brush, II ................ G06F 3/011
709/202
9,690,784 B1 * 6/2017 Hughes ................ G06F 3/0481
(Continued)

FOREIGN PATENT DOCUMENTS

WO 2012007764 1/2012

OTHER PUBLICATIONS

PCT International Application No. PCT/US2020/037314, Invitation to Pay Additional Fees and, Where Applicable, Protest Fee dated Sep. 23, 2020, 17 pages.
(Continued)

*Primary Examiner* — James S. McClellan
*Assistant Examiner* — Ross A Williams
(74) *Attorney, Agent, or Firm* — Lee, Hong, Degerman, Kang & Waimey PC

(57) ABSTRACT

Systems and methods for controlling performance of a digital character depicted at a display device are disclosed. According to at least one embodiment, a method for controlling performance of a digital character depicted at a display device includes: determining a presence of a person located in a physical environment; and in response to determining the presence of the person, facilitating control of the performance of the digital character depicted at the display device by a human operator, by an artificial intelligence (AI) game-engine, or by a combination thereof.

16 Claims, 9 Drawing Sheets

(51) Int. Cl.
*G06T 13/40* (2011.01)
*A63F 13/211* (2014.01)
*A63F 13/215* (2014.01)
*A63F 13/213* (2014.01)
*G06V 40/10* (2022.01)
*A63J 99/00* (2009.01)

(52) U.S. Cl.
CPC ............ *A63F 13/215* (2014.09); *G06T 13/40* (2013.01); *G06V 40/10* (2022.01); *G10L 25/51* (2013.01); *A63F 2300/105* (2013.01); *A63F 2300/1025* (2013.01); *A63F 2300/1081* (2013.01); *A63F 2300/1087* (2013.01); *A63J 99/00* (2013.01)

(58) Field of Classification Search
CPC ........ A63F 2300/105; A63F 2300/1081; A63F 2300/1087; G06K 9/00362; G06T 13/40; G10l 25/51; A63J 99/00
See application file for complete search history.

(56) References Cited

U.S. PATENT DOCUMENTS

| 10,664,863 | B1* | 5/2020 | Mishra | G06Q 30/0277 |
| 2004/0023723 | A1* | 2/2004 | Jandel | H04L 29/12047 463/42 |
| 2007/0060233 | A1* | 3/2007 | Liccardo | A63F 13/12 463/8 |
| 2017/0103541 | A1* | 4/2017 | Bellusci | G06T 7/73 |
| 2021/0004137 | A1 | 1/2021 | Oser | |

OTHER PUBLICATIONS

Nevgen, et al. "MSQRD—Live Filters & Face Swap for Video Selfies Support", Dec. 2015, 4 pages.
"Optical vs. Inertial Motion Capture", Sep. 1, 2017, 8 pages.
Damgrave, et al. "The Drift of the Xsens Moven Motion Capturing Suit during Common Movements in a Working Environment", Laboratory of Design, Production and Management, Faculty of Engineering Technology, 6 pages.

* cited by examiner

DIGITAL CHARACTER INTERACTING WITH CUSTOMER IN PHYSICAL REALM

CROSS-REFERENCE TO RELATED APPLICATION(S)

Pursuant to 35 U.S.C. § 119(e), this application claims the benefit of U.S. Provisional Patent Application No. 62/860,188, filed Jun. 11, 2019, the contents of which are hereby incorporated by reference herein in its entirety.

BACKGROUND

Amusement parks may include various features to provide a unique experience to guests. For example, an amusement park may have various rides and shows that entertain guests. Furthermore, the amusement park may have show effects and props that may create a desirable environment or atmosphere for guests. Such features may include entertainment figures (e.g., animated characters, animated figures) that may interact with guests. For instance, the entertainment figures may speak, wave, walk, or perform any other suitable actions.

SUMMARY

With respect to various embodiments disclosed herein, techniques for controlling performance of a digital character depicted in digital animation are presented. According to various embodiments, the performance is controlled to facilitate interaction between the digital character and a live customer.

According to at least one embodiment, a method for controlling performance of a digital character depicted at a display device is disclosed. The method includes: determining a presence of a person located in a physical environment; and in response to determining the presence of the person, facilitating control of the performance of the digital character depicted at the display device by a human operator, by an artificial intelligence (AI) game-engine, or by a combination thereof.

According to at least one embodiment, an apparatus for controlling performance of a digital character depicted at a display device includes: a network communication unit configured to transmit and receive data; and one or more controllers. The one or more controllers are configured to: determine a presence of a person located in a physical environment; and in response to determine the presence of the person, facilitate control of the performance of the digital character depicted at the display device by a human operator, by an AI game-engine, or by a combination thereof.

According to at least one embodiment, a machine-readable non-transitory medium has stored thereon machine-executable instructions for controlling performance of a digital character depicted at a display device. The instructions include: determining a presence of a person located in a physical environment; and in response to determining the presence of the person, facilitating control of the performance of the digital character depicted at the display device by a human operator, by an AI game-engine, or by a combination thereof.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, as well as procedural, changes may be made without departing from the scope of the present invention. Wherever possible, the same reference numbers will be used throughout the drawings to refer to the same or similar parts.

Embodiments disclosed herein are directed to a system for controlling a digital character to interact with a customer. For example, the interaction may include a delivery of a physical product for retrieval by a customer. Example embodiments include a system that visually resembles a food truck and that outputs food for a customer, a system that vends movie tickets to a customer, and a system that facilitates performance of a rope tug-of-war between a digital character and a customer.

An example embodiment will be described with reference to FIG. 1.

Figure 1:
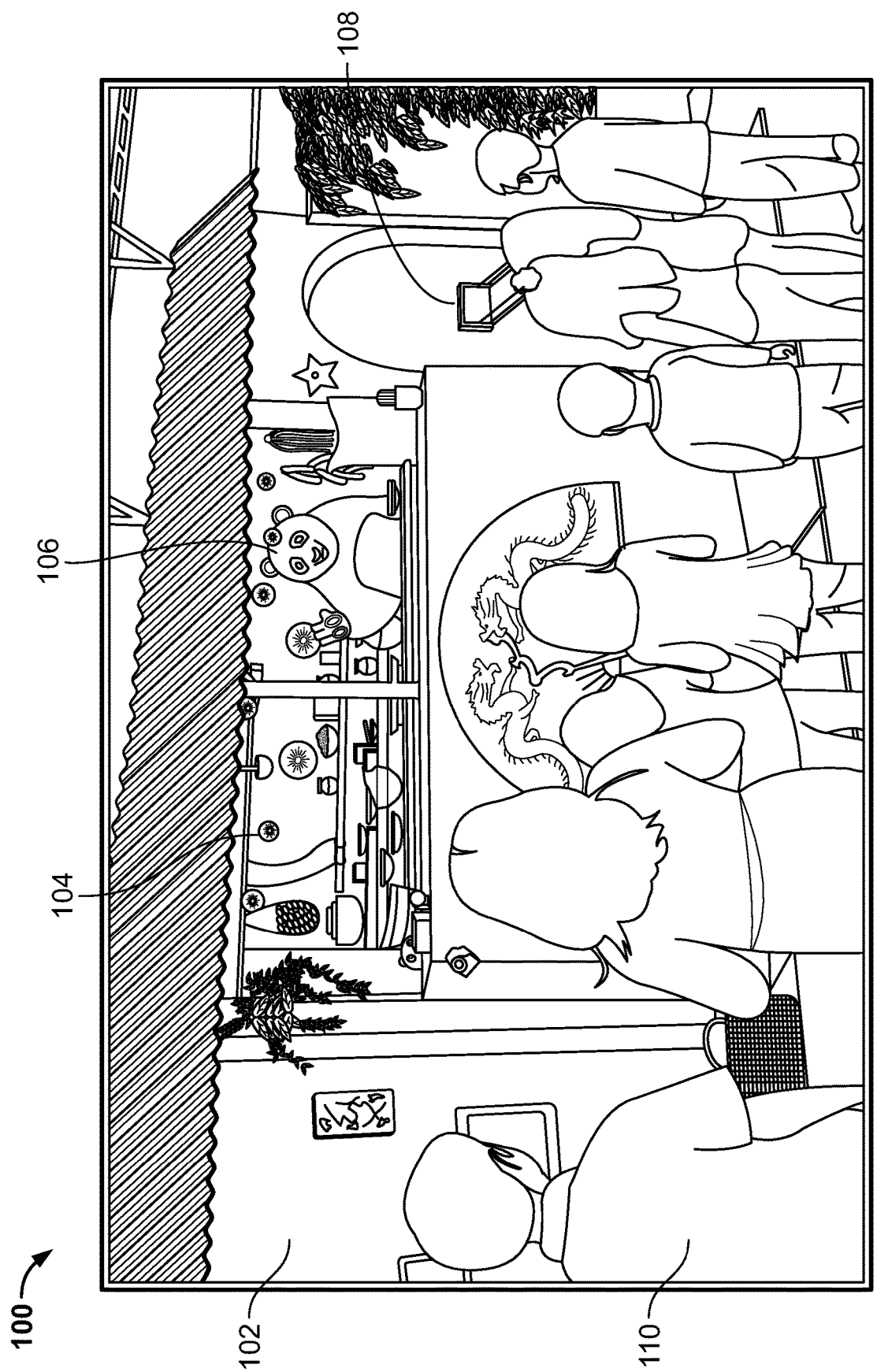
FIG. 1 illustrates a system for controlling a digital character to interact with a customer according to at least one embodiment.

FIG. 1 illustrates a system 102 for controlling a digital character to interact with a customer according to at least one embodiment. The system 102 is located (at least in part) in an environment 100. Also present in the environment 100 are one or more customers 110. The system 102 includes a display device 104, and an output channel 108. The display device 104 is positioned to be in clear view of the customers 110. As will be explained in more detail later, one or more items may be delivered via the output channel 108 for retrieval by a customer 110.

Further, the system 102 includes at least one video capture device (e.g., a camera) and at least one audio capture device (e.g., a microphone). The video and audio capture devices may be positioned, to capture actions (or inactions) that occur in the environment 100—in particular, actions (or inactions) made by the customers 110. Examples of such actions include movements or motions made by a customer 110 leading toward or away from the system 102 (e.g., toward or away from the display 104), motions or gestures made by the customer 110, and facial expressions and reactions made by the customer 110. As will described in further detail below, the capturing facilitates detection of a presence of the customer 110 in the environment 100, and/or interaction with the customer 110 (e.g., by one or more digital characters depicted at the display device 104).

As noted earlier, the display device 104 of the system 102 is positioned to be in clear view of the customers 110. The display device 104 displays video (e.g., digital video). As will be described in more detail below, the video that is displayed may include interactive elements and/or features.

For purposes of description, events that are depicted as occurring in the video displayed at the display device 104 will be referred to as events occurring "in the digital realm." Separately, other events (e.g., events occurring in the environment 100) will be referred to as events occurring "in the physical realm." From the perspective of the customers 110, the display device 104 may be perceived as a "window" into a physical space defined by the system 102, where events occurring in the digital realm are perceived as occurring in a physical space defined by one or more elements of the system 102.

With continued reference to FIG. 1, a digital character 106 is depicted in the video that is displayed at the display device 104. By way of example, the digital character 106 may be authored via live-motion capture of a human operator.

Figure 2A:
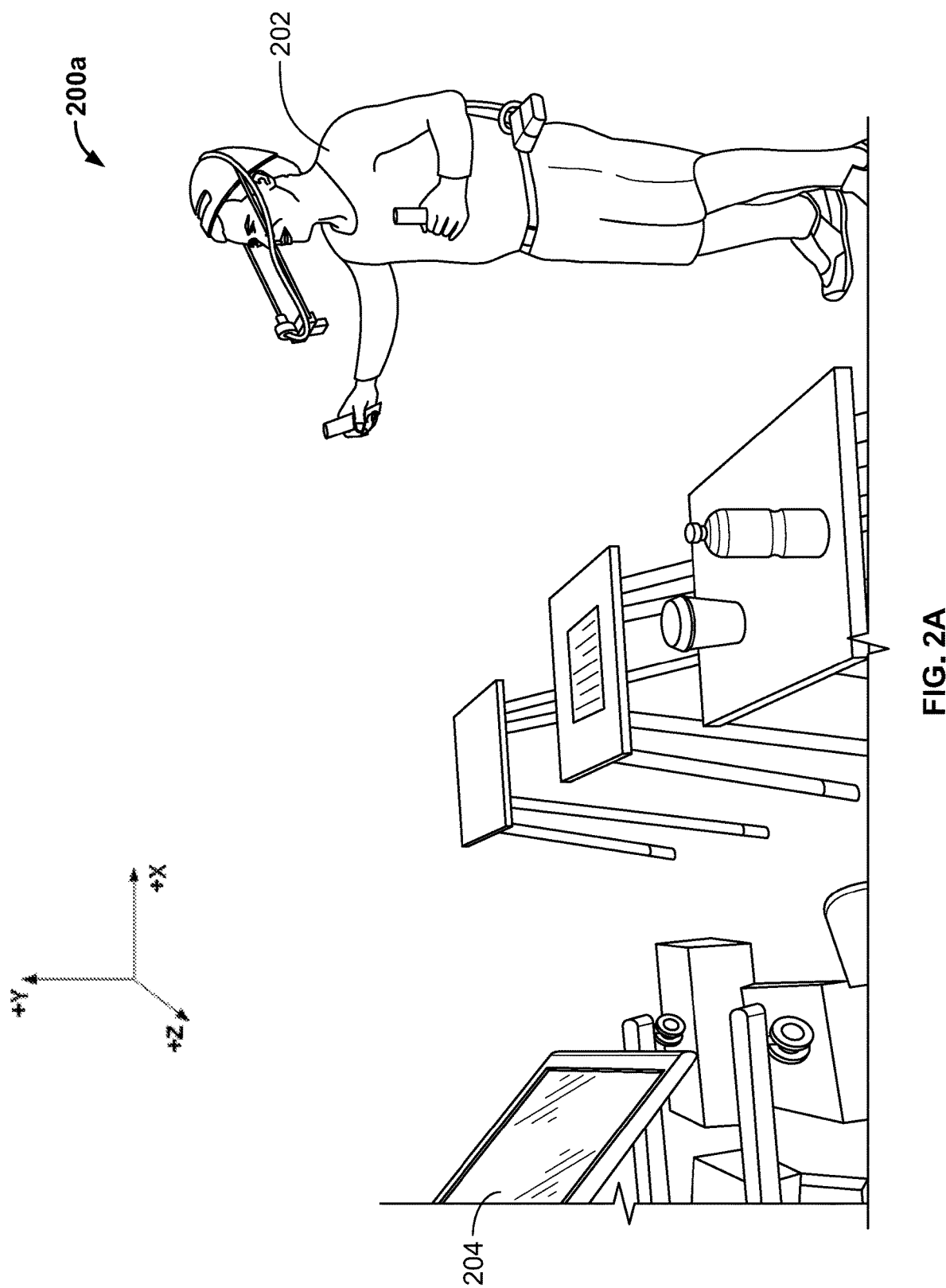
FIGS. 2A and 2B illustrate examples of live-motion capture for controlling the digital character.

For example, with reference to FIG. 2A, the digital character 106 is authored via live-motion capture of a human operator 202 located in an environment 200a. The environment 200a may be located in a vicinity of the environment 100, or at a location remote from the environment 100. If the environment 200a is located near the environment 100, then the environment 200a may be configured so that the human operator is hidden from view of the customers 110 present in the environment 100.

In the environment 200a, a display device 204 is provided. The display device 204 outputs video and audio captured by the video and audio capture devices that were described earlier with reference to the system 102. Accordingly, the human operator 202 may be informed, in real-time, of actions (or inactions) that occur in the environment 100. In this manner, the human operator 202 may effectively interact with the customers 110 present in the physical realm, via the digital character 106 depicted in the digital realm.

For example, the human operator 202 may ask the customers 110: "Does anyone want cookies?" Accordingly, through live-motion capture, the digital character 106 is depicted in the digital realm as asking, "Does anyone want cookies?" Customers 110 watching the digital video displayed at the display device 104 perceive such actions occurring in the digital realm.

The customers 110 may respond accordingly. For example, one customer 110 may raise his/her hands. As another example, another customer 110 may exclaim: "Yes!"

By monitoring the display device 204, the human operator 202 is able to observe such actions made by the customers. For example, by continuing to monitor the camera footage, the human operator 202 can (1) change or shift his/her gaze such that the digital character 106 looks directly into the eyes of a customer 110 (e.g., if the customer 110 remains relatively still), and (2) reach towards the customer 110 (e.g., if the customer 110 reaches towards or points to a particular portion of the display device 104). In a similar manner, other interactions between the digital character 106 and the customer 110 may include a shaking of hands with the customer 110, a hugging of the customer 110, being tangibly affected by a push from the customer, etc.

In at least one embodiment, the bridging of the digital realm and the physical realm may be achieved by configuring the digital character to extend out a limb for shaking a hand of the customer 110, or for giving an item to the customer 110. By way of example, this may be achieved by controlling a physically operated puppet limb, operated in the physical realm by a human puppeteer who is hidden from view of the customers 110. The physically operated puppet limb may be controlled to reach out towards the customers 110 and directly interact with the customer 110 in the physical realm. In this situation, the physically operated puppet limb may be an animatronic arm and hand that moves realistically based on real-time control by the puppeteer. According to another embodiment, a digitally operated puppet limb may be controlled to reach out and directly interact with the customer 110. For example, the digitally operated puppet limb may be controlled via digital information from a performer (e.g., human operator 202) who is authoring the character experience. In this situation, the performer may control the limb in real-time to extend or retract, by manually operating an onscreen interface, a keyboard trigger, a button or a joystick input. Real-time data from the performer would operate the mechanics of the hand and cause the arm to move around in a controlled, robotically legal manner. According to another embodiment involving a digitally operated puppet limb, the performer may instigate the handshake simply by reaching his/her arm out to a known area of a capture volume. The extending and retraction of the puppet limb and other movements thereof would be solved by the performer, with the results also retargeted to the animatronic puppet limb in a controlled, robotically legal way.

Figure 2B:
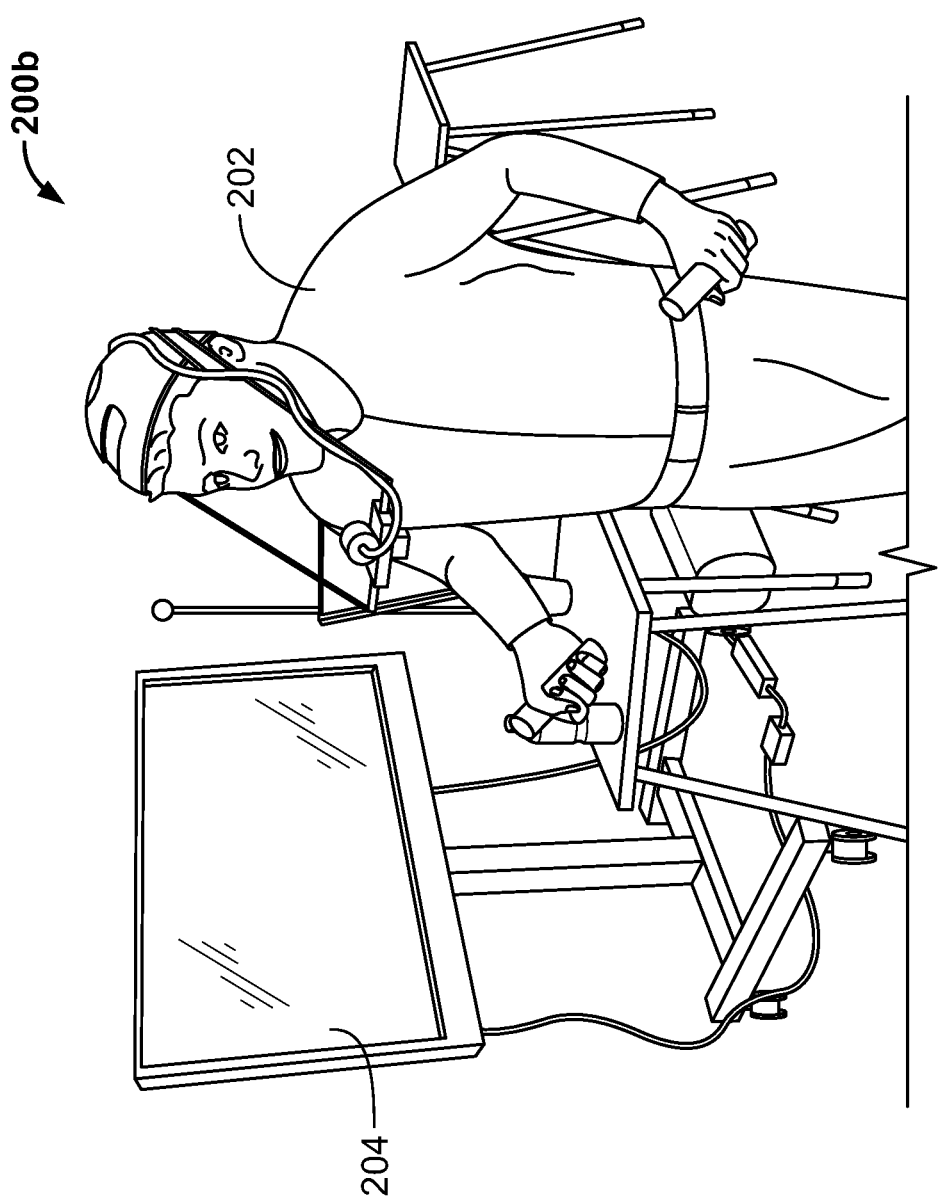

In response to seeing and/or hearing reactions made by the customers 110, the human operator 202 may move within the environment 200a, as if he were retrieving a box of cookies for the customers 110. Then, with reference to FIG. 2B, the human operator 202 may move within the environment 200b as if he were delivering the retrieved box to one or more waiting customers 110.

The movements of the human operator 202 are replicated in the digital realm by the digital character 106. For example, in the digital realm, the digital character 106 retrieves a box of cookies and then moves in a direction leading towards the output channel 108.

In the foregoing, the movements of the human operation 202 may be monitored using a motion capture system. Motion capture systems according to one or more embodiments will now be described in more detail.

Optical systems (or optical motion capture systems) utilize data captured from image sensors to triangulate the 3D position of a subject between two or more cameras calibrated to provide overlapping projections. The data may be captured using markers attached to an actor (e.g., human operator 202). Tracking a larger number of performers or expanding a capture area may be achieved by increasing a number of cameras.

With respect to optical systems, occlusions occur when a model marker point is not present in a cloud of points, for example, when the number of observed points is lower than the number of model marker points. Such events may occur due to any of variety of reasons, such as the interposition of one or more opaque objects between the marker and the cameras or when the marker goes out of the camera field of view (FOV).

According to at least one embodiment, a drift corrections system includes (e.g., in a hybridized manner) one or more aspects of an optical motion capture system, together with one or more aspects of an inertial motion capture system. Such a system may allow for occlusion-free motion capture that is correct positionally in a capture area (such as environment 200a) and that would not drift over time.

Aspects of the inertial motion capture system include using an inertial body capture suit as known in the art. The inertial body capture suit may be of a type that is for facilitating live-motion capture of the human operator 202, as described earlier with reference to FIG. 2A. For example, such an inertial body capture suit measures the joint angles of the human operator 202 and estimates his/her position from an initial starting point, for example, by counting footsteps. In this regard, errors may accumulate over time, because the inertial motion capture system produces approximate results based on magnetometers that are included in the suit. For example, the inertial motion capture system may approximate a location of true north, but errors may result due to effects of natural magnetic interference on the accuracy of the magnetometers.

To help correct for phenomena such as occlusions and artifacts such as those caused by magnetic interference, a system may use aspects of both an inertial motion capture system and an optical system. According to at least one embodiment, the aspects of the optical system would be simpler than those of an optical system that might typically be used for full body motion capture. For example, the optical system may be used to focus on the waist of the actor. According to at least one embodiment, an optical system includes using a rigid apparatus (or rigid body) that is wearable by the human operator 202. According to at least one embodiment, data from an inertial motion capture system and data from an optical system are combined (or fused together) and used to drive a digital character (e.g., digital character 106).

By way of example, data regarding rotations and height off the ground (see, e.g., Y-axis of FIG. 2A) may be received from an inertial body capture suit of an inertial motion capture system, and data regarding a horizontal plane (see, e.g., a plane defined by X- and Z-axes of FIG. 2A) may be received from an optical system.

As described earlier, an optical motion capture system may include a rigid body. The rigid body may be stably attachable to the human operator 202 being drift corrected. According to at least one embodiment, the rigid body includes markers placed thereon. For example, the markers may be retro-reflective markers. Such markers may be placed on the rigid body in a unique pattern such that the rigid body would have a unique identity (e.g., configuration or arrangement of markers) that is recognizable or identifiable by the optical motion capture system.

Figure 3:
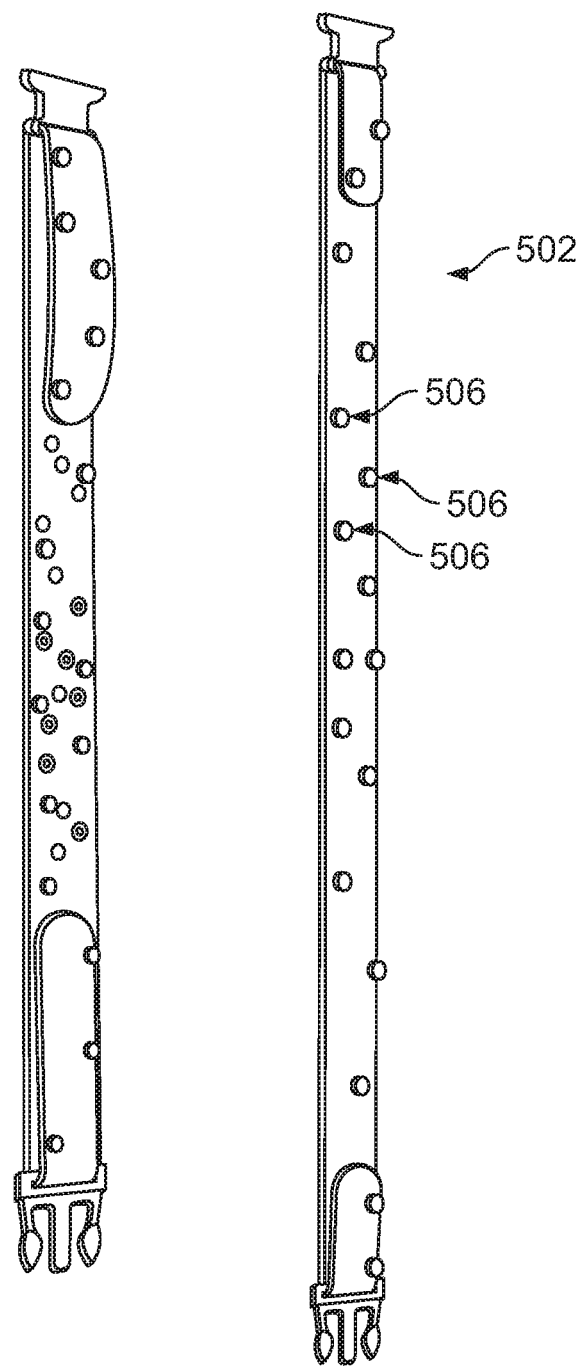
FIG. 3 illustrates an example of a rigid body according to at least one embodiment.

FIG. 3 illustrates an example of a rigid body 502 according to at least one embodiment. As illustrated, the rigid body 502 may take the form of a belt. The belt is configured to be worn around the waist of a person (e.g., human operator 202). The rigid body 502 is relatively small in bulk, such that, while the wearer of the rigid body moves, the rigid body moves with the hips of the wearer without moving independently with respect to the wearer. The rigid body 502 may be made of a fairly rigid material, and may have a uniform width (e.g., 1 or 2 inches). Markers 506 may be positioned along the circumference of the rigid body 502. As described earlier, the markers 506 may be positioned on the rigid body in a unique pattern. For example, in the example illustrated in FIG. 3, a total of twenty-five markers 506 are placed along the circumference of the rigid body 502 in a unique zigzag pattern.

Alternatively, instead of positioning markers 506 directly on a belt, the markers 506 may be positioned (indirectly) on a belt via one or more rigid bodies that are positioned (directly) on the belt. In this alternative example, markers 506 may be placed directly on the rigid bodies, which are, in turn, placed on the belt. For example, five markers 506 may be placed on each of a total of five rigid bodies, which are, in turn, placed on the belt. The placement of the rigid bodies on the belt (as well as the placement of the markers on the rigid bodies) may be in a unique pattern.

It is understood that as few as one optical marker may be sufficient for purposes of achieving an acceptable level of drift correction. However, according to at least one embodiment, two or more optical markers are utilized to achieve a higher level of robustness with respect to occlusion.

With respect to the optical system, various embodiments will now be described with reference to an "extrinsic" system. According to such embodiments, an array of two or more cameras is installed around the periphery of a capture area (e.g., a room). The cameras capture views of the capture area as well as of one or more markers (e.g., markers 506 on the rigid body 502) as the rigid body (as worn by a human operator) moves around the capture area. The static cameras observe the moving markers and, accordingly, provide data (e.g., accurate rotations and translations) regarding the moving markers, solved to a rigid object (e.g., a computer-generated bone) in computer-animation software.

Figure 4:
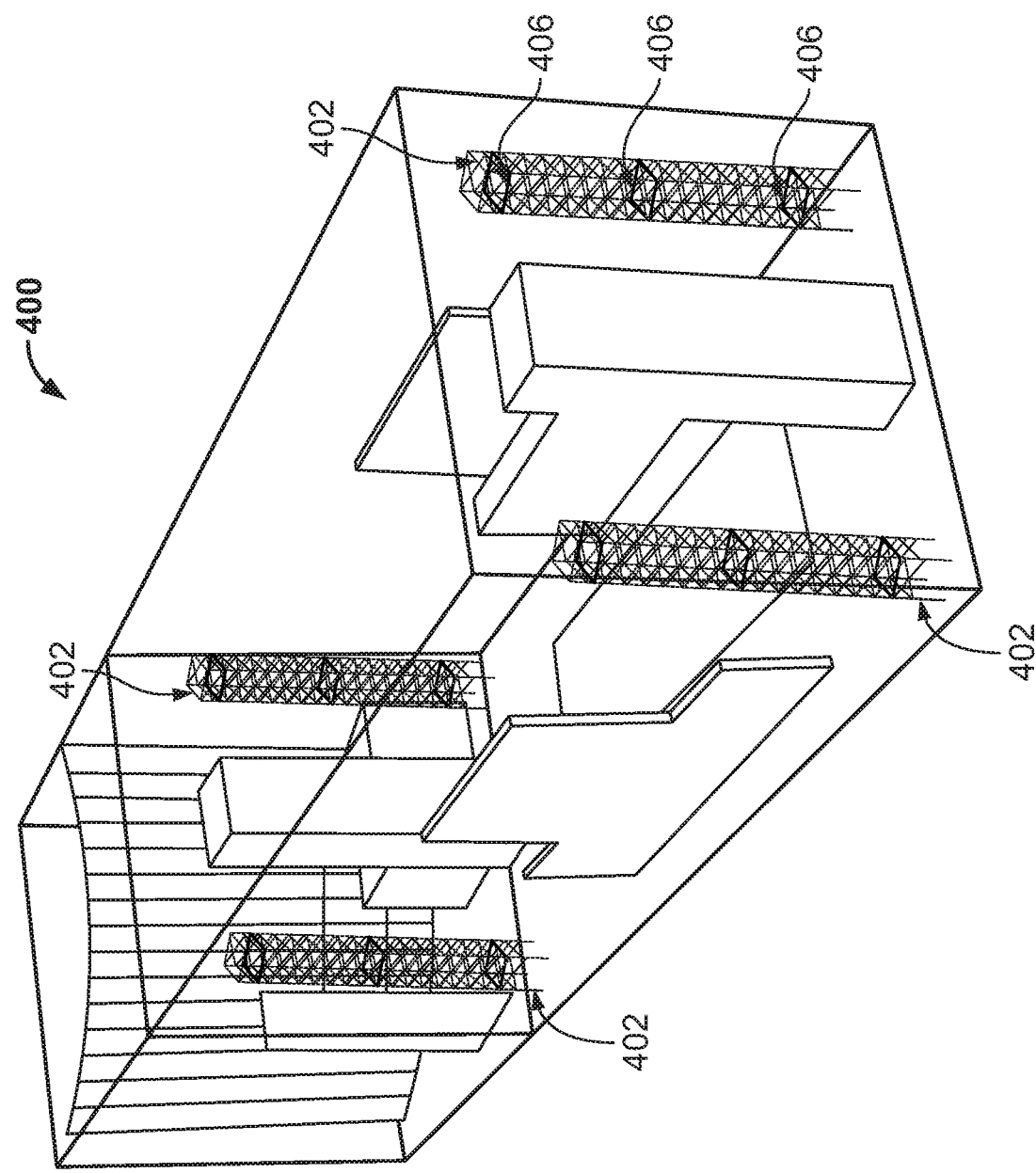
FIG. 4 illustrates a 3D view of a capture area.

FIG. 4 illustrates a 3D view of a capture area (e.g., room) 400. In at least one embodiment, one or more cameras are installed on each tower that is placed in the capture area 400. For example, as illustrated in FIG. 4, four towers 402 are placed in the capture area 400, one tower 402 being located at each corner. For purposes of illustration, each tower 402 may be an eight-foot-tall box truss including a two-foot-wide, one-inch-thick aluminum plate. Each of the towers 402 may have three cameras 406 installed thereon. Within one tower 402, the cameras 406 may be spaced apart from each other—e.g., by approximately two feet between one another along the height of the tower.

The cameras 406 may be on a small aluminum plate that is inserted into the box truss. A geared three-way positioning head may also be on the plate. The cameras 406 may be attached to the positioning head, and the head may be geared to be set at exact rotations and to be locked into place once aiming of the head is completed. As noted earlier, the towers 402 are positioned at the corners of the capture area 400.

Each tower 402 generates its own data. During calibration of the cameras 406, a static object (e.g., rigid body 502) may be placed at a middle of the capture area 400. The cameras 406 may be calibrated concurrently by configuring the optical system to triangulate off of the static object. Accordingly, a position of the static object within the room may be determined. As noted earlier, data regarding a horizontal plane (see, e.g., a plane defined by X- and Z-axes of FIG. 2A) may be received from the optical system. Such data may be combined (or fused) with data regarding rotations and height off the ground (see, e.g., Y-axis of FIG. 2A), which is received from an inertial body capture suit of an inertial motion capture system. A combination of the data may be used to generate animation of a digital character. For example, rotational data received from the inertial system may be used to animate a skeleton of the digital character, and data received from the optical system may be used to correct a position of the hips of the digital character.

With respect to the optical system, various embodiments have been described with reference to an "extrinsic" system. According to at least another embodiment, an "intrinsic" system is utilized. In such a system, a camera is worn by a human operator to monitor markers located in the capture area (e.g., over the ceiling, the floor and/or walls of the room) according to a unique pattern. When the human operator moves about the room, the camera moves together with the human operator and monitors the static markers such that an accurate estimate of its own rotation and position in the room, relative to the fixed markers on the walls, floor or ceiling of the room, may be produced.

As described earlier, markers placed on a rigid body and/or a belt may be retro-reflective markers. According to at least one other embodiment, the markers may be light emitting devices (LEDs) that emit light in a wavelength detectable by the optical motion capture system.

As described earlier, a drift corrections system is created by combining (or hybridizing) aspects of an optical motion capture system, with aspects of an inertial motion capture system. According to at least one other embodiment, a drift corrections system is created by combining (or hybridizing) aspects of a magnetic motion capture system, with aspects of an inertial motion capture system. Such embodiments may operate in a manner similar to the manner described earlier with respect to embodiments employing an optical motion capture system. For example, a magnetic "marker" may be placed on a human operator. At either end of the room, a magnetic detection system may be placed. The magnetic detection system may emit a magnetic field and detect a magnetic interference caused to the field by the magnetic marker. The detected interference may be used to determine the position of the magnetic marker.

In at least one embodiment, techniques employing Wi-Fi technologies may be utilized. Such embodiments may operate in a manner similar to the manner described earlier with respect to embodiments employing a magnetic motion capture system. For example, a Wi-Fi antenna or antennas may be placed around the room, and a Wi-Fi emitter may be placed on the human operator. As the human operator moves within the room, the Wi-Fi emitter may move closer to or farther from one antenna or another. Characteristics of the signal received at the antenna(s) may be used to determine the position of the emitter within the room.

In at least one embodiment, techniques employing acoustic technologies may be utilized. Such embodiments may operate in a manner similar to the manner described earlier with respect to embodiments employing an optical motion capture system. In this regard, one of at least two configurations may be used. For example, in one configuration, a microphone is placed on the human operator, and ultrasonic emitters are placed around the room. As another example, in another configuration, an emitter is placed on the actor, and microphones are placed around the room. In embodiments employing acoustic technologies, time of flight (ToF) may be used to determine the position of whichever object is placed on the human operator (e.g., microphone or emitter). Much in the way echolocation works, the emitters make an ultrasonic ping sound and the microphone (or microphone array) detect the ping and calculate the distance traveled by the ping sound based on the delay (the time of flight) from emitter to microphone.

In at least one embodiment, one or more depth cameras may be utilized to determine the position of the human operator in the room. For example, a depth camera may project an infrared (IR) grid and then detect how the human operator is distorting that grid to determine where the operator is and movements made by the operator. As another example, an array of IR LEDs may flash on and off in sequence to perform ToF calculations when light shines from the LEDs, bounces off the human operator and then returns to the depth camera, to make the depth calculations.

In at least one embodiment, markers need not be employed. For example, in a simpler system, one or more video cameras may be used to track particular features of the human operator or on the rigid body, to determine the position of the human operator in the room.

Figure 5:
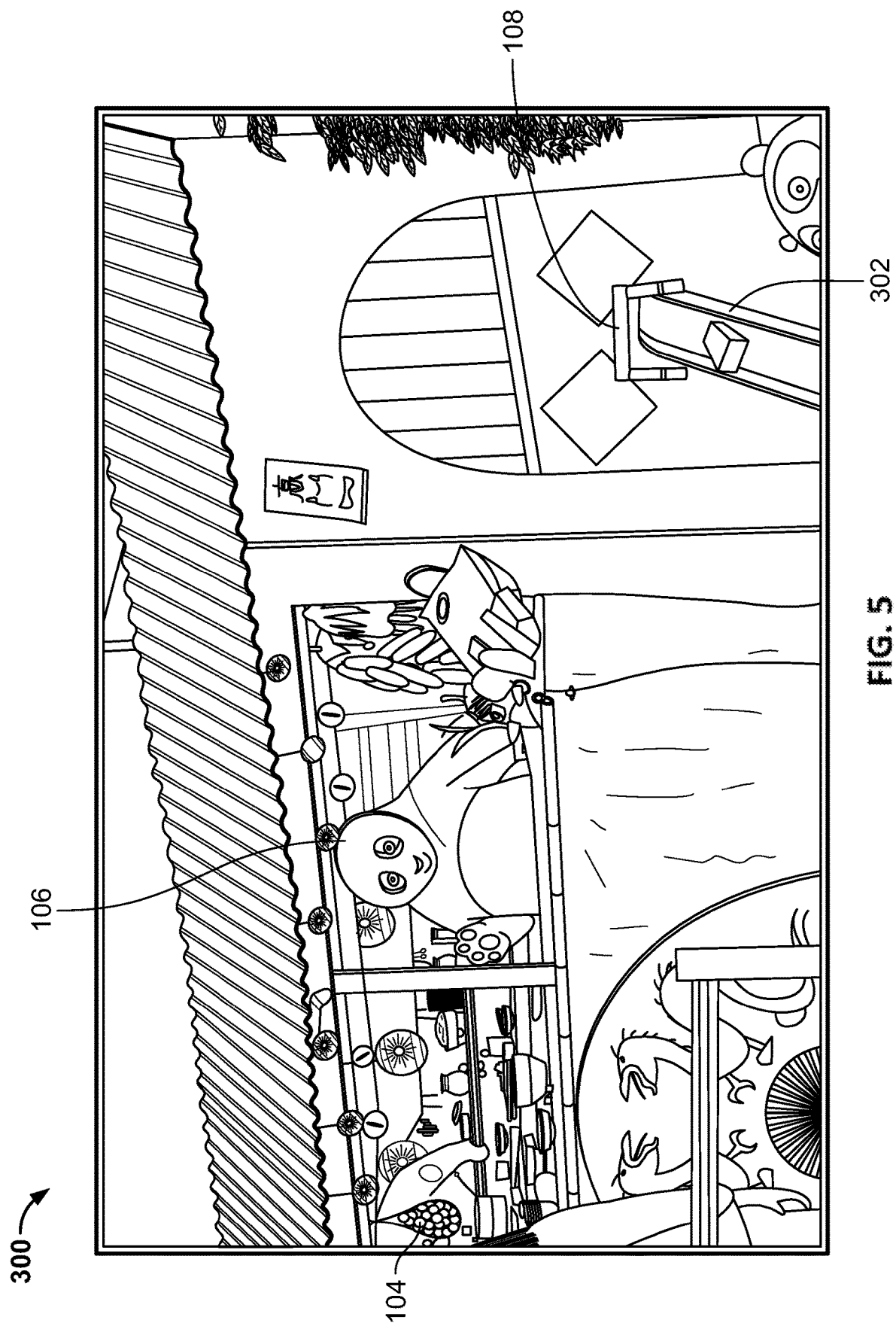
FIG. 5 illustrates an example delivery of a physical item for retrieval by the customer.

With reference to an environment 300 of FIG. 5, in the physical realm, a box 302 containing cookies is delivered at the output channel 108. For example, the system 102 may include a dispenser that dispenses items upon being controlled (e.g., by the human operator 202).

As described earlier with reference to FIG. 1, the system 102 includes at least one video capture device (e.g., a camera) and at least one audio capture device (e.g., a microphone). It is understood that the camera and microphone and camera can exist in the virtual world and be experienced by a customer in virtual reality. For example, a customer may be controlling a digital avatar existing in the digital realm through an input device, such as a joystick, a mouse, or a virtual reality (VR) or motion capture input. Interactions occur within the digital realm, except for a vending/delivery of an item (e.g., box 302), which still occurs in the physical realm. For example, the customer plays a game, which interacts with game characters corresponding to the customers, and not directly with the customers. In this situation, the customers enter and experience the digital realm as digital avatars, the movements of which are controlled by the customers, based on input provided in the physical realm. As such, an avatar can be controlled to move in the digital realm in some manner (e.g., walk, jump, fly, teleport). When the presence of the digital avatar is detected in the digital realm, interactions with the digital avatar are initiated similar to a manner in which interactions with a customer are initiated upon detection of a presence of the customer in the physical realm (e.g., environment 100). Once the customer has triggered a change to occur in the physical realm (e.g., the delivery of an item), the change is realized in the physical realm.

As also described earlier with reference to FIGS. 1, 2A, 2B, 3 and 4, a digital character (e.g., digital character 106) may be authored via live-motion capture of a human operator (e.g., human operator 202). Live-motion capture driven operation may be applied to a particular part (or aspect) of the digital character (or an object such as box 302 in FIG. 5), or may drive the entire digital character or prop, when suitable. According to one or more embodiments, the human operator drives the performance of the digital character with real-time Musical Instrument Digital Interface (MIDI) input and/or digital puppeteering using devices such as controllers, keyboards, joysticks, mice, foot pedals, microphones, etc. In such embodiments, live-motion capture may not be used exclusively. For example, motion capture may be used to drive the performance of the face of a digital character, and the remaining aspects of the performance are driven using triggered input devices. According to one or more other embodiments, the digital character 106 may be authored entirely via live-motion capture of a human operator.

According to one or more other embodiments, the performance and decision-making for the digital character is authored entirely by an artificial intelligence (AI) character resident in a game engine.

According to one or more other embodiments, the performance and decision-making for the digital character may be achieved using a combination of an AI game-engine driven character and human motion capture. By way of example, during particular times(s)—for example, while the system is waiting to be engaged by a customer—the digital character may be at least partially driven by AI (e.g., by playing loops of ambient motion or other character-based animation). At another time(s), a transition from being driven by AI to being driven by motion capture may occur. For example—upon system detection of a presence of a customer 110, the performance (e.g., animation control) of the digital character may be transitioned to the human operator, who can interact with the customer in a more personable manner. Leading to such a transition, the system 102 may signal the human operator that he/she is to be given at least partial control over the performance of the digital character. For example, the system 102 may provide an audio and/or visual indication(s) to inform the human operator that he/she is to be given control over the vocal performance of the digital character, the facial performance of the digital character, or the entire performance of the digital character.

In a similar manner, a transition from being driven by motion capture to being driven by AI game-engine technology may occur. Decisions made by such AI technology may be based on analysis of data captured by the video capture device (e.g., camera) and/or the audio capture device (e.g., microphone) of the system 102. For example, analysis of data captured by the camera may be used to identify not only positions of various customers 110, but also certain characteristics of particular customers, for example, a blue-colored article of clothing (e.g., shirt) worn by one customer 110, or the blond-colored hair of another customer 110. As such, even when the performance of the digital character is being driven by AI game-engine technology (rather than by a human operator), the digital character may still, to some degree, interact with the customers 110. For example, the eyes of the digital character may be driven to move such that it appears that a "gaze" of the digital character follows movements made by a customer 110. Also for example, the digital character may be driven to wave at a particular customer 110 and/or say a somewhat customized or personalized greeting to the customer 110 wearing the blue article of clothing or the customer 110 who has the blonde hair.

Similarly, analysis of data captured by the microphone may be used to interface with the customers 110, at least to some degree. For example, when such analysis detects a sound as having a particular characteristic (e.g., a sound exceeding a certain threshold audio level), the performance of the digital character may be selectively driven by a particular clip of (prepared) animation. In such a clip, the eyes of the digital character may move such that it appears that the gaze of the digital character shifts up and outwards, as if in search of the source of the sound that was heard. As another example, waveform analysis may be performed on speech audio that is captured by the microphone. Such analysis may be used in discerning the mood or emotional state of a customer 110 that has spoken. In this situation, the mood in which the digital character delivers an audio greeting to the customer 110 may be selected to match or mirror the mood that is discerned by the waveform analysis. For example, if the mood of the customer 110 is discerned as being happy or cheerful, the digital character may be controlled to address the customer 110 in a happy or cheerful manner.

Accordingly, AI game-engine technology may be used to effectively execute a certain branch in a decision tree (e.g., using the selected clip of animation to drive the performance of the digital character) in response to a certain catalyst (e.g., detection of a sound having a particular characteristic). This may improve the likelihood that the digital character appears lifelike and capable of reacting to real-world events occurring in the physical realm (e.g., of the environment 100). This may be preferable to performance of a digital character in which the character merely repeats certain actions, while appearing to be oblivious to events occurring in the physical realm.

As such, the performance of the digital character need not be driven by a human operator at all times. For example, the performance of the digital character may be driven by AI game-engine technology during some (or most) times, and by a human operator during selected times (e.g., one or more key times). As another example, the performance of the digital character may be driven by AI game-engine technology during most of the day (e.g., 11 hours, in total, over a 12-hour day of operation), and control of the digital character may be assigned to a human operator during a selected period (e.g., a selected hour during such a day of operation). The period may be selected in order to provide more personalized interaction with the customers 110 during that period. At the end of such a period, the human operator may return control of the performance of the digital character to the AI game-engine technology. The return may be chosen to occur at a time so as to provide a more seamless transition, from the perspective of the customers 110. The human operator may return control of the performance of the digital character at such a time by, for example, manually operating an onscreen interface, a keyboard trigger, a button or a joystick input.

In at least one embodiment, performance of the digital character may, at times, be driven concurrently by AI game-engine technology as well as by a human operator. For example, when the digital character is at least partially driven by AI in interacting with a customer 110, a human operator may wish to enhance the performance of the digital character. In this situation, the human operator may control the AI-driven performance in one or more ways. For example, if the human operator discerns the mood of the customer 110 as being not merely happy or cheerful, but, rather, particularly happy or cheerful, the human operator may control the digital character to address the customer 110 in a similarly heightened manner. Such control may be executed by, for example, manually operating an onscreen interface, a keyboard trigger, a button or a joystick input. In this manner, the performance of the digital character may (temporarily) be directed, at least in part, by the human operator.

According to embodiments that will be described in more detail later, multiple digital characters may be depicted at the display device 104. Each of such characters may be controlled via a respective varying combination of AI game-engine driven character and human motion capture, as described earlier.

As described earlier with reference to various embodiments, actions (or inactions) that occur in the environment 100—in particular, actions (or inactions) made by the customers 110—are captured, e.g., by a camera and a microphone. Upon detection of a presence of a customer 110 in the environment 100 (e.g., one or more particular areas within the environment 100), interactions with the customer are initiated. It is understood that the detection may be performed, additionally and/or alternatively, using other devices. Such other devices include a pressure pad, a depth camera, a sonic-range detection device, a light-beam device, and/or a heat- or sound-detection device.

The devices may detect not only the presence of the customer, but also other parameters such as the head height and the body position of the customer. For example, the customer may be detected using video cameras, depth sensors, or a light or sound beam that is broken, to determine the body position and the height of the customer. Knowledge of such information (e.g., in relation to the position of the display device 104) may allow angular corrections to be made to the head or eye angles of the digital character 106, so that the eye line of the digital character aligns more closely with that of one or more of the customers. By detecting a head height of the customer more accurately, such devices can effectively "true up" the eye line of the digital character.

As also described earlier with reference to various embodiments, the interaction includes one or more interactions between a digital character and a customer with respect to both the digital realm and the physical realm. For example, in the digital realm, the digital character may perform steps to prepare or procure an item (e.g., a box 302 of cookies) for a customer. In the physical realm, the item is given (or sold) to the customer in real-time, such that the item is capable of being retrieved or collected by the customer (e.g., at the output channel 108). According to one or more further embodiments, the item is provided such that it can be retrieved by the customer at another location (e.g., somewhere outside of the environment 100). According to one or more further embodiments, the item is delivered to the customer (e.g., by physical mail) at a later date and/or time.

According to one or more other embodiments, the interactions between the digital character and the customer include an interaction that causes (or brings about) a change in the physical realm of the environment 100. For example, the system 102 may include a pulley to facilitate performance of a game of tug-of-war between the digital character and the customer.

By way of example, a human operator 202 having control of the performance of the digital character asks: "Does anyone want to play a game of tug-of-war with me?" Accordingly, in the digital realm, the digital character 106 asks the customers 110: "Does anyone want to play a game of tug-of-war with me?" In the physical realm, the customers 110 may respond accordingly. For example, one customer 110 may raise his/her hands. As another example, another customer 110 may exclaim: "Yes!"

In response to seeing and/or hearing reactions made by the customers 110, the human operator 202 may move within the environment 200a, as if the human operator 202 were retrieving a rope with which the game is to be played. Then, the human operator 202 may move within the environment 200b as if the human operator 202 were moving the retrieved rope towards one or more waiting customers 110.

The actions of the human operator 202 are replicated, in the digital realm, by the digital character 106. For example, in the digital realm, the digital character 106 retrieves a rope and moves in a direction leading towards the output channel 108.

In the physical realm, a free end of a rope is extended out through the output channel 108. The other end of the rope may be coupled to a pulley system that is hidden from view of the customers 110. After one of the customers takes hold of the rope, a game of tug-of-war may begin.

According to one or more further embodiments, examples of other interactions that cause a change in the physical realm of the environment 100 include: an object in the physical realm being caused to be moved (e.g., knocked over) in response to an action (e.g., tripping or falling) by the digital character in the digital realm; a light in the physical realm being controlled to be turned on/off in response to an action by the digital character in the digital realm; and some other aspect in the physical realm to be changed in response to an action by the digital character in the digital realm.

In a similar manner, actions by a customer in the physical realm that are detected by the system 102 may result in a change in the digital realm. For example, facial responses or expressions by a customer, the body posture of a customer, other movements made by a customer, or vocal reactions or sounds made by a customer may be detected and cause related events to occur in the digital realm.

The interactions between the physical realm and the digital realm are not limited to those involving customers and digital characters. For example, the presence of one or more specific objects in the physical realm that is detected may result in a change in the digital realm, and vice versa. For example, the change may involve corresponding or related objects in the digital realm. By way of example, an object being moved by the customer in the physical realm, either intentionally or unintentionally, may be followed by a movement of a corresponding or related object by the digital character in the digital realm.

Causing a change in the physical realm of the environment 100 may be performed to increase the likelihood that the customer will engage with one or more digital characters in the digital realm. If customer engagement is not detected and the performance of the digital character is at least partially authored by AI, the system 102 may enter a loop state where it continuously (or periodically) monitors for detected engagement. Alternatively (or in addition), the system 102 may begin to display follow-up animations in order to motivate the customer to engage with the digital character(s). Alternatively (or in addition), the system 102 may return to a waiting state in which a particular set of animations is displayed until the presence of a customer is detected.

As described earlier with reference to various embodiments, an object such as a box of cookies may be delivered (e.g., via the output channel 108) for retrieval by a customer. In this situation, the object may be delivered relatively soon after the request by the customer (e.g., the customer says "Yes!") is detected. In other situations, the delivery may occur after a certain delay. For example, a toy sword may be delivered to the customer. In the physical realm, a pre-made toy sword may be retrieved for placement at a receiving end of the output channel. However, in the digital realm, a digital character may prepare the toy sword (e.g., from raw materials) in a blacksmith shop. In such a situation, animation loops (or sequences) may be displayed at the display device (e.g., display device 104), to show the preparation of the toy sword. The display of such loops may continue, until feedback is received in the physical realm indicating that delivery of the toy sword is to occur. Upon reception of such feedback, the display of the loops comes to an end, and, in the digital realm, the preparation of the toy sword is completed. Examples of such feedback will be described in more detail later.

According to another example, the object may be an item that does require some preparation time in the physical realm. For example, the object may be a food item (e.g., a bowl of soup noodles) that is requested (or ordered) by the customer.

Before the request is received, the presence of the customer may first be detected. As described earlier with reference to various embodiments, movements of one or more customers (e.g., in an environment 100) may be detected. Upon the detection of one or more movements (e.g., one or more particular movements such as movements towards the display device 104), actions are performed to solicit engagement by the customer. For example, when the system 102 is designed to visually resemble a kitchen or the exterior of a food truck, a sequence (e.g., game sequence) is initiated such that the display device 104 displays one or more digital characters that are preparing food. For example, in the digital realm, the digital characters are chopping vegetables, cooking noodles, etc.

The depiction of one more items in the digital realm, such as a spoon or pot for cooking, can be controlled in a number of ways. For example, the item may have a counterpart present in the physical realm, such as a spoon (made, e.g., out of plastic or foam) that is carried by an actor (e.g., human operator 202 of FIG. 2A) who can be tracked by motion capture. As another example, the depiction of the item could be controlled digitally, when the item exists within a game engine like an object in a video game. In this situation, an actor may interact with the item by making a grabbing gesture and putting his/her hand near the item to alert the game engine that he/she wants to pick up the item. The actor may also trigger the grabbing gesture via a controller or button press. In another example, the actor could trigger the item to appear from thin air into his/her hand by pressing a button or by reaching into a specific 'zone.'

As described earlier with reference to FIG. 2B—in the digital realm, the digital character 106 retrieves a box of cookies. The actor may achieve this retrieval of the box by reaching his hand up into the air so that the hand of the digital character 106 enters into an invisible cube in the digital realm that exists out of frame (e.g., just out of frame) with respect to a display (e.g., display 104). Once the hand of the digital character 106 has entered this zone, a box is placed in his hand in the digital realm. When the actor lowers his arm in the physical realm, the box appears in the hand of the digital character 106 in the digital realm, appearing as if the digital character 106 had reached off-screen and pulled a box from an unseen shelf.

According to another example, a combination of one or more items in the physical realm along with one or more items in the digital realm is utilized. For example, such a combination may be utilized to achieve the chopping of a carrot in the digital realm by the digital character. The combination may involve a counterpart (e.g., a physical prop) in the physical realm that is held by the actor and that corresponds to a knife in the digital realm, and a carrot existing only in the digital realm. Movement of the physical prop is tracked such that the knife appears in the hand of the digital character and moves accordingly. As the cutting edge of the knife moves near the carrot in the digital realm, the carrot is depicted as being sliced into pieces. As the side of the knife is brought near the carrot pieces, the pieces may be depicted as being moved off the edge of a cutting board and into a pot. This movement of the carrot pieces may be depicted as also being caused directly by the hand of the digital character (for example, by the actor motioning so as to sweep the carrot pieces into the pot). However, in order to achieve a higher degree of realism, it is understood that only the knife (and not the hand of the digital character) is capable of causing the carrot to be sliced into pieces.

Triggered motion(s) can also be achieved in a similar manner. Such motions include, for example, martial-arts movements that a typical unskilled person cannot readily perform. These motions may be triggered by a button press on a controller that blends from live motion into one or more canned motions or may be triggered by the actor performing a gesture (e.g., an alternative gesture) that, when recognized by the system, launches the triggered motion. For example, an actor could kick his/her leg, and the system may recognize the kick as a trigger for a special Kung Fu jump-kick sequence. According to a further example, the triggered motion does not completely drive the performance of the digital character. For example, only one or more portions of the body of the digital character may be driven by the triggered motion. By way of example, while the triggered motion is performed by the torso, arms and/or legs of the digital character, the face of the digital character may still be controlled by the actor (e.g., via motion capture).

Returning to detection of a presence of a customer, a request from the detected customer is received. Receiving the request may involve using natural language processing (to receive and process verbal requests). Alternatively (or in addition), receiving the request may involve using an interface that is operable by the customer. For example, the customer may operate a button on a touchscreen, or fill out an instruction card that is inserted into and read by a machine.

After the customer requests a specific item, preparation of the item begins in the physical realm. For example, a food preparer (e.g., a cook) who is located in the vicinity of the environment 100 begins preparing the item that was requested.

Concurrently, in the digital realm, actions depicting the preparation of the item occur. Such actions may be customized based on the customer's request. For example, based on the customer's request that the soup noodles include extra carrots, a sequence that is executed may include depiction of carrots flying across the kitchen of the digital realm.

The animation that is displayed at the display device 104 may be continuously controlled while preparation of the requested item in the physical realm is in progress. For example, during preparation of the requested item, feedback may be received from the food preparer, e.g., indicating that more time is required before the preparation is finished. Such feedback may cause additional loops of a particular sequence to be displayed. Here, it is understood that the animation that is displayed at the display device 104 may be controlled concurrently by AI game-engine technology as well as by a human operator, similar to a manner in which the performance of a particular digital character may be controlled, as described earlier with reference to various embodiments.

Additionally, the animation may continue to be controlled when the requested item is nearing or at completion. For example, feedback may be received from the food preparer, e.g., indicating that the item is ready for output. The feedback may originate from a pressure sensor that senses that an object (e.g., the requested item) has been placed at a determined location. Accordingly, the food preparer may place the requested item at or near the pressure sensor, to provide feedback indicating that the item is ready for output. As another example, the system 102 may include an interface that is operable by the food preparer. Accordingly, the food preparer may operate a button on a touchscreen to signal that the item is ready for output.

In the physical realm, the item may be placed at the output channel 108 for retrieval by the customer.

Based on features described, the timing of events occurring in the digital realm (e.g., the preparation of the item by the digital character(s) as depicted the displayed animation) can be better aligned with the timing of events occurring in the physical realm (e.g., the preparation of the item by the food preparer). For example, the timing in both realms can be better aligned, such that the bowl of soup noodles appears in the physical realm at the output channel 108, as it disappears from view in the digital realm. According to one or more particular embodiments, the item presented at the output channel 108 is selected to match in visual appearance the item that is depicted in the digital realm.

Figure 6:
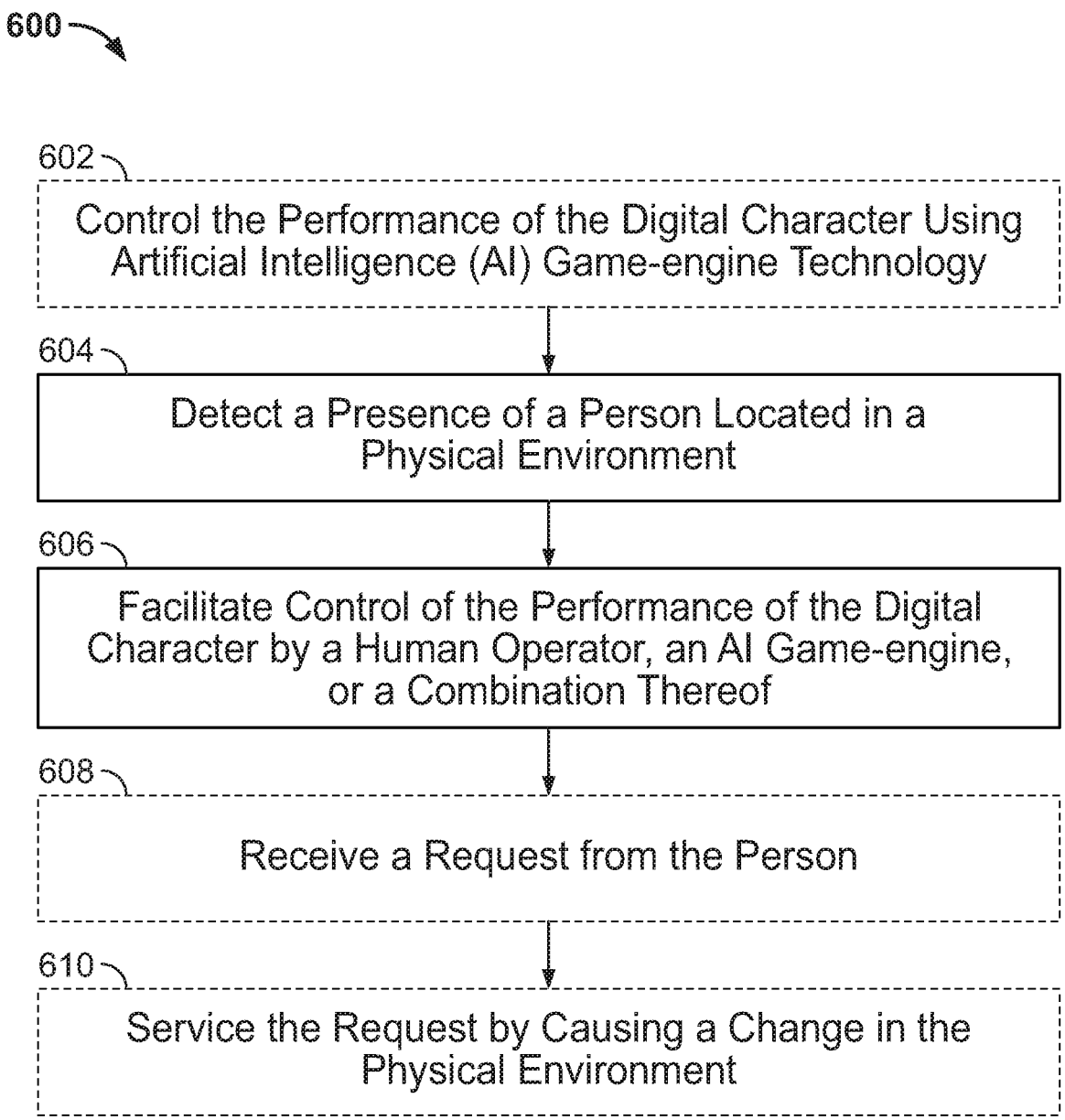
FIG. 6 illustrates a flowchart of a method of controlling performance of a digital character depicted at a display device according to at least one embodiment.

FIG. 6 illustrates a flowchart of a method 600 of controlling performance of a digital character depicted at a display device according to at least one embodiment.

At block 602, according to a particular embodiment, the performance of the digital character may be controlled using AI game-engine technology. For example, with reference to FIG. 1, the performance of the digital character 106 is controlled using AI game-engine technology.

At block 604, a presence of a customer located in a physical environment is detected. For example, with continued reference to FIG. 1, a presence of a customer 110 located in the physical environment 100 is detected.

According to a further embodiment, the detection of the presence of the customer is performed based on data received from at least a camera or a microphone located in the physical environment.

According to a further embodiment, detecting the presence of the customer may include autonomously determining a characteristic of an appearance of the customer or an emotional state of the customer. For example, data received from the camera may be used in determining that a customer 110 is wearing a blue-colored article of clothing. As another example, data received from a microphone may be used for detection and for determining that the customer 110 is happy or sad.

At block 606, in response to detecting the presence of the customer, control of the performance (or at least an aspect thereof) of the digital character by a human operator, an AI game-engine, or a combination thereof is facilitated. For example, with reference to FIG. 2A, in response to detecting the presence of the customer 110, control of the performance of the digital character 106 by a human operator 202 is facilitated.

According to a further embodiment, facilitating control of the performance of the digital character may include providing at least one option selectable by the human operator. The selectable option is for controlling the digital character to address the customer according to the determined characteristic or the determined emotional state. For example, if the human operator 202 discerns the mood of the customer 110 as being particularly happy or cheerful, the human operator may control the digital character 106 to address the customer 110 in such a particularly happy or cheerful manner.

According to a further embodiment, facilitating control of the performance of the digital character may include receiving motion capture data corresponding to the human operator. By way of example, receiving the motion capture data may include receiving data from an optical motion capture system (e.g., a system utilizing cameras 406 of FIG. 4) and receiving data from an inertial motion capture system (e.g., a system utilizing an inertial body capture suit worn by the human operator 202).

According to a further embodiment, the data received from the optical motion capture system may include data corresponding to one or more optical markers located at a waist region of the human operator. For example, the data received from the optical motion capture system may include data corresponding to markers 506 that are located at a waist region of the human operator 202.

In a further embodiment, the control of at least the portion of the performance of the digital character by the human operator is facilitated such that performance of the digital character is concurrently driven by both the human operator and AI game-engine technology.

At block 608, according to a particular embodiment, a request is received from the customer. For example, with reference to FIG. 1, a customer 110 may request that a box of cookies be provided.

At block 610, the request may be serviced by causing a change in the physical environment in which the customer is located. By way of example, the request may be serviced by providing a physical object to be delivered for retrieval by the customer. For example, with reference to FIG. 5, the box 302 containing cookies is provided to be delivered for retrieval by the customer 110.

Figure 7:
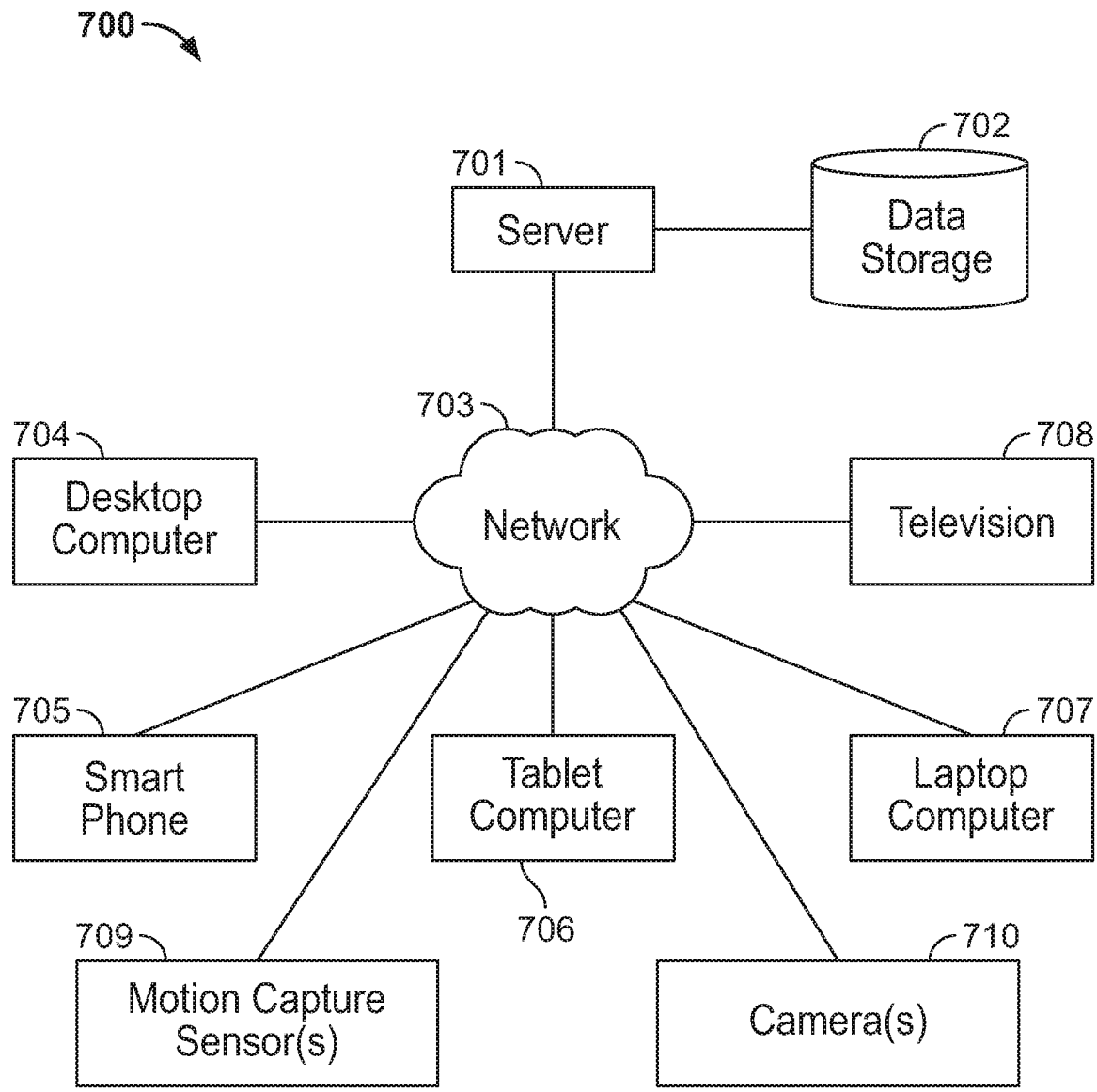
FIG. 7 is an illustration of a computing environment according to at least one embodiment.

In selected embodiments, features and aspects described herein may be implemented within a computing environment 700, as shown in FIG. 7, which may include one or more computer servers 701. The server 701 may be operatively coupled to one or more data stores 702 (e.g., databases, indexes, files, or other data structures). The server 701 may connect to a data communication network 703 including a local area network (LAN), a wide area network (WAN) (e.g., the Internet), a telephone network, a satellite or wireless communication network, or some combination of these or similar networks.

One or more client devices 704, 705, 706, 707, 708, 709, 710 may be in communication with the server 701, and a corresponding data store 702 via the data communication network 703. Such client devices 704, 705, 706, 707, 708, 709, 710 may include, for example, one or more laptop computers 707, desktop computers 704, smartphones and mobile phones 705, tablet computers 706, televisions 708, motion capture sensor(s) 709, camera(s) 710, or combinations thereof. In operation, such client devices 704, 705, 706, 707, 708, 709, 710 may send and receive data or instructions to or from the server 701 in response to user input received from user input devices or other input. In response, the server 701 may serve data from the data store 702, alter data within the data store 702, add data to the data store 702, or the like, or combinations thereof.

In selected embodiments, the server 701 may transmit one or more media files including audio and/or video content, encoded data, generated data, and/or metadata from the data store 702 to one or more of the client devices 704, 705, 706, 707, 708, 709, 710 via the data communication network 703. The devices may output the audio and/or video content from the media file using a display screen, projector, or other display output device. In certain embodiments, the system 700 configured in accordance with features and aspects described herein may be configured to operate within or support a cloud computing environment. For example, a portion of, or all of, the data store 702 and server 701 may reside in a cloud server.

Figure 8:
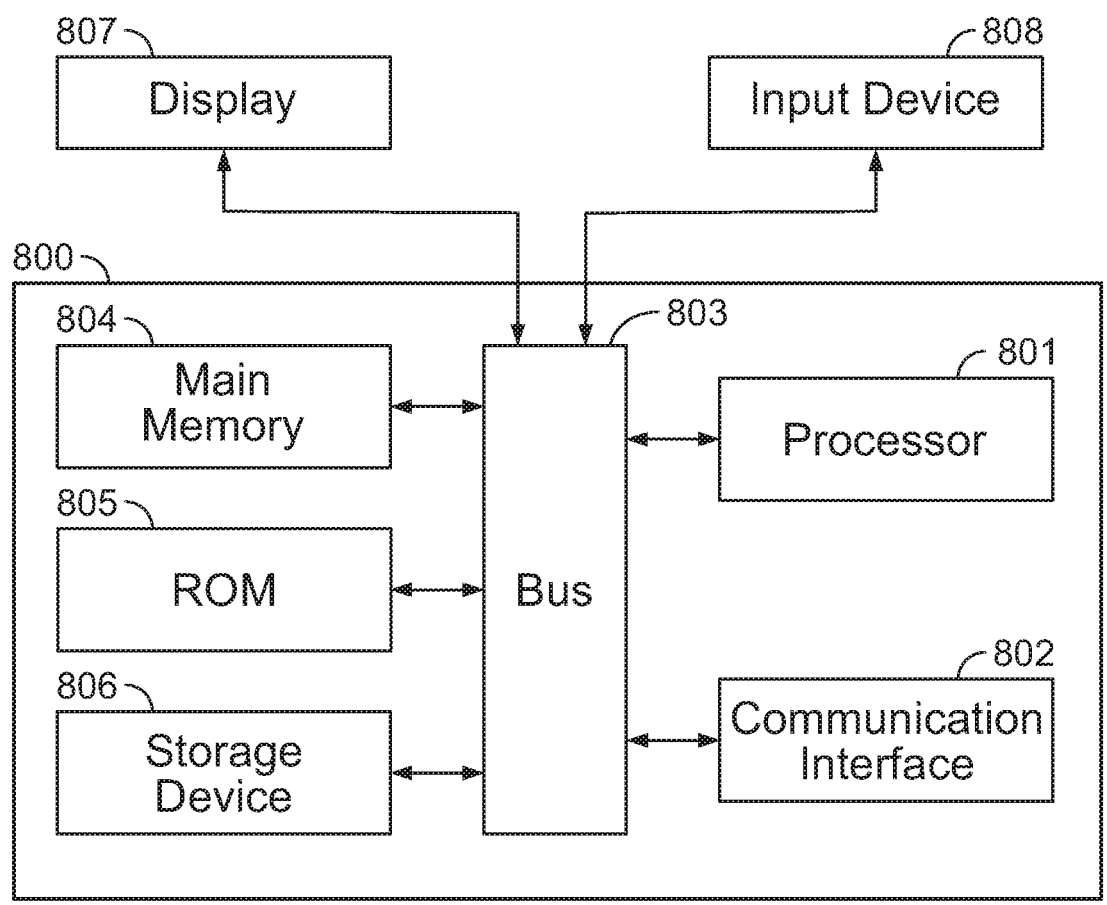
FIG. 8 is a block diagram of a device according to at least one embodiment.

With reference to FIG. 8, an illustration of an example computer 800 is provided. One or more of the devices 704, 705, 706, 707, 708 of the system 700 may be configured as or include such a computer 800.

In selected embodiments, the computer 800 may include a bus 803 (or multiple buses) or other communication mechanism, a processor 801, main memory 804, read only memory (ROM) 805, one or more additional storage devices 806, and/or a communication interface 802, or the like or sub-combinations thereof. Embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

The bus 803 or other communication mechanism, including multiple such buses or mechanisms, may support communication of information within the computer 800. The processor 801 may be connected to the bus 803 and process information. In selected embodiments, the processor 801 may be a specialized or dedicated microprocessor configured to perform particular tasks in accordance with the features and aspects described herein by executing machine-readable software code defining the particular tasks. Main memory 804 (e.g., random access memory—or RAM—or other dynamic storage device) may be connected to the bus 803 and store information and instructions to be executed by the processor 801. Main memory 804 may also store temporary variables or other intermediate information during execution of such instructions.

ROM 805 or some other static storage device may be connected to a bus 803 and store static information and instructions for the processor 801. The additional storage device 806 (e.g., a magnetic disk, optical disk, memory card, or the like) may be connected to the bus 803. The main memory 804, ROM 805, and the additional storage device 806 may include a non-transitory computer-readable medium holding information, instructions, or some combination thereof—for example, instructions that, when executed by the processor 801, cause the computer 800 to perform one or more operations of a method as described herein. The communication interface 802 may also be connected to the bus 803. A communication interface 802 may provide or support two-way data communication between the computer 800 and one or more external devices (e.g., other devices contained within the computing environment).

In selected embodiments, the computer 800 may be connected (e.g., via the bus 803) to a display 807. The display 807 may use any suitable mechanism to communicate information to a user of a computer 800. For example, the display 807 may include or utilize a liquid crystal display (LCD), light emitting diode (LED) display, projector, or other display device to present information to a user of the computer 800 in a visual display. One or more input devices 808 (e.g., an alphanumeric keyboard, mouse, microphone) may be connected to the bus 803 to communicate information and commands to the computer 800. In selected embodiments, one input device 808 may provide or support control over the positioning of a cursor to allow for selection and execution of various objects, files, programs, and the like provided by the computer 800 and displayed by the display 807.

The computer 800 may be used to transmit, receive, decode, display, etc. one or more video files. In selected embodiments, such transmitting, receiving, decoding, and displaying may be in response to the processor 801 executing one or more sequences of one or more instructions contained in main memory 804. Such instructions may be read into main memory 804 from another non-transitory computer-readable medium (e.g., a storage device).

Execution of sequences of instructions contained in main memory 804 may cause the processor 801 to perform one or more of the procedures or steps described herein. In selected embodiments, one or more processors in a multi-processing arrangement may also be employed to execute sequences of instructions contained in main memory 804. Alternatively, or in addition thereto, firmware may be used in place of, or in connection with, software instructions to implement procedures or steps in accordance with the features and aspects described herein. Thus, embodiments in accordance with features and aspects described herein may not be limited to any specific combination of hardware circuitry and software.

Non-transitory computer readable medium may refer to any medium that participates in holding instructions for execution by the processor 801, or that stores data for processing by a computer, and include all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, the communication interface 802 may provide or support external, two-way data communication to or via a network link. For example, the communication interface 802 may be a wireless network interface controller or a cellular radio providing a data communication network connection. Alternatively, the communication interface 802 may include a LAN card providing a data communication connection to a compatible LAN. In any such embodiment, the communication interface 802 may send and receive electrical, electromagnetic, or optical signals conveying information.

A network link may provide data communication through one or more networks to other data devices (e.g., client devices as shown in the computing environment 700). For example, a network link may provide a connection through a local network of a host computer or to data equipment operated by an Internet Service Provider (ISP). An ISP may, in turn, provide data communication services through the Internet. Accordingly, a computer 800 may send and receive commands, data, or combinations thereof, including program code, through one or more networks, a network link, and communication interface 802. Thus, the computer 800 may interface or otherwise communicate with a remote server (e.g., server 701), or some combination thereof.

The various devices, modules, terminals, and the like described herein may be implemented on a computer by execution of software comprising machine instructions read from computer-readable medium, as discussed above. In certain embodiments, several hardware aspects may be implemented using a single computer; in other embodiments, multiple computers, input/output systems and hardware may be used to implement the system.

For a software implementation, certain embodiments described herein may be implemented with separate software modules, such as procedures and functions, each of which performs one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for controlling performance of a digital character depicted at a display device located in a physical environment, the method comprising:
   determining a presence of a first person located in the physical environment;
   in response to determining the presence of the first person, facilitating control of the performance of the digital character depicted at the display device by a second person and an artificial intelligence (AI) game-engine in combination,
   wherein determining the presence of the first person comprises autonomously determining at least one of a characteristic of an appearance of the first person, an emotional state of the first person, or an audio originating from the first person, and
   wherein facilitating control of the performance of the digital character by the second person comprises providing at least one option selectable by the second person, for controlling the digital character to, in an interaction with the first person, address the first person according to the determined characteristic or the determined emotional state of the first person; and
   during the interaction with the first person, causing a change in the physical environment in which the first person is located, in response to an action by the digital character depicted at the display device, wherein the change in the physical environment corresponds to a physical object different from the display device.

2. The method of claim 1, wherein the determination of the presence of the first person is performed based on data received from at least a camera or a microphone located in the physical environment.

3. The method of claim 1, wherein facilitating control of the performance of the digital character by the second person comprises receiving motion capture data corresponding to the second person.

4. The method of claim 3, wherein receiving the motion capture data comprises:
   receiving data from an optical motion capture system; and
   receiving data from an inertial motion capture system.

5. The method of claim 4, wherein the data received from the optical motion capture system comprises data corresponding to one or more optical markers located at a waist region of the second person.

6. The method of claim 4, wherein the data received from the optical motion capture system is for performing drift correction of a position of the second person that is determined based on the data received from the inertial motion capture system.

7. The method of claim 1, wherein the control of the performance of the digital character by the second person is facilitated such that performance of the digital character is concurrently driven by both the second person and the AI game-engine.

8. The method of claim 1, further comprising:
   receiving a request from the first person; and
   servicing the request by causing a change in the physical environment in which the first person is located, wherein servicing the request comprises providing a physical object to be delivered for retrieval by the first person.

9. An apparatus for controlling performance of a digital character depicted at a display device located in a physical environment, the apparatus comprising:
   a network communication unit configured to transmit and receive data; and
   one or more controllers configured to:
   determine a presence of a first person located in the physical environment;
   in response to determining the presence of the first person, facilitate control of the performance of the digital character depicted at the display device by a second person and an artificial intelligence (AI) game-engine in combination,
   wherein the one or more controllers are further configured to determine the presence of the first person by autonomously determining at least one of a characteristic of an appearance of the first person, an emotional state of the first person, or an audio originating from the first person, and
   wherein the one or more controllers are further configured to facilitate control of the performance of the digital character by the second person by providing at least one option selectable by the second person, for controlling the digital character to, in an interaction with the first person, address the first person according to the determined characteristic or the determined emotional state of the first person; and
   during the interaction with the first person, cause a change in the physical environment in which the first person is located, in response to an action by the digital character depicted at the display device, wherein the change in the physical environment corresponds to a physical object different from the display device.

10. The apparatus of claim 9, wherein the determination of the presence of the first person is performed based on data received from at least a camera or a microphone located in the physical environment.

11. The apparatus of claim 9, wherein the one or more controllers are configured to facilitate control of the performance of the digital character by the second person by receiving motion capture data corresponding to the second person.

12. The apparatus of claim 11, wherein receiving the motion capture data comprises:
   receiving data from an optical motion capture system; and
   receiving data from an inertial motion capture system.

13. The apparatus of claim 12, wherein the data received from the optical motion capture system comprises data corresponding to one or more optical markers located at a waist region of the second person.

14. The apparatus of claim 12, wherein the data received from the optical motion capture system is for performing drift correction of a position of the second person that is determined based on the data received from the inertial motion capture system.

15. The apparatus of claim 9, wherein the control of the performance of the digital character by the second person is facilitated such that performance of the digital character is concurrently driven by both the second person and the AI game-engine.

16. A machine-readable non-transitory medium having stored thereon machine-executable instructions for controlling performance of a digital character depicted at a display device located in a physical environment, the instructions comprising:
   determining a presence of a first person located in the physical environment;

in response to determining the presence of the first person, facilitating control of the performance of the digital character depicted at the display device by a second person and an artificial intelligence (AI) game-engine in combination, wherein determining the presence of the first person comprises autonomously determining at least one of a characteristic of an appearance of the first person, an emotional state of the first person, or an audio originating from the first person, and wherein facilitating control of the performance of the digital character by the second person comprises providing at least one option selectable by the second person, for controlling the digital character to, in an interaction with the first person, address the first person according to the determined characteristic or the determined emotional state of the first person; and during the interaction with the first person, causing a change in the physical environment in which the first person is located, in response to an action by the digital character depicted at the display device, wherein the change in the physical environment corresponds to a physical object different from the display device.

* * * * *